United States Patent [19]

Bensinger et al.

[11] Patent Number: 5,411,440
[45] Date of Patent: * May 2, 1995

[54] CONSTANT VELOCITY UNIVERSAL JOINT HAVING AN INNER JOINT PART WITH SPHERICAL TRUNNIONS PROVIDED WITH ROLLER MEMBERS GUIDED IN AN OUTER PART

[75] Inventors: Jörg Bensinger, Hennef; Krude Werner, Neunkirchen-Seelscheid; Dieter Jost, Troisdorf, all of Germany

[73] Assignee: GKN Automotive AG, Lohmar, Germany

[ * ] Notice: The portion of the term of this patent subsequent to Dec. 1, 2009 has been disclaimed.

[21] Appl. No.: 74,721

[22] Filed: Jun. 10, 1993

Related U.S. Application Data

[63] Continuation of Ser. No. 940,234, Sep. 3, 1992, abandoned, which is a continuation of Ser. No. 607,232, Oct. 31, 1990, Pat. No. 5,167,583.

[30] Foreign Application Priority Data

Nov. 3, 1990 [DE] Germany ............... 39 36 601.4

[51] Int. Cl.⁶ ............................................. F16D 3/205
[52] U.S. Cl. ..................................... 464/111; 464/132; 464/905
[58] Field of Search ............... 464/111, 120, 123, 124, 464/132, 905

[56] References Cited

U.S. PATENT DOCUMENTS

| | | |
|---|---|---|
| 4,129,343 | 12/1978 | Janssen . |
| 4,379,706 | 4/1983 | Otsuka et al. ............ 464/111 |
| 4,565,540 | 1/1986 | Orain ....................... 464/111 |
| 4,578,048 | 3/1986 | Hirai et al. ............... 464/111 |
| 4,773,890 | 9/1988 | Iwasaki et al. ........... 464/111 |
| 4,854,917 | 8/1989 | Mizukoshi ................ 464/111 |
| 5,167,583 | 12/1992 | Bensinger et al. ........ 464/111 |

FOREIGN PATENT DOCUMENTS

| | | |
|---|---|---|
| 2831044 | 10/1979 | Germany . |
| 3103172 | 12/1981 | Germany . |
| 3619728 | 12/1986 | Germany . |
| 3803340 | 8/1988 | Germany . |
| 3716962 | 5/1989 | Germany . |
| 59-40016 | 5/1984 | Japan . |

*Primary Examiner*—Daniel P. Stodola
*Assistant Examiner*—Eileen A. Dunn
*Attorney, Agent, or Firm*—Harness, Dickey & Pierce

[57] ABSTRACT

A constant velocity universal joint of the tripod type having an outer joint part provided with three circumferentially distributed, axially extending longitudinal recesses with circumferentially distributed opposed running faces, an inner joint part provided with three circumferentially distributed radial journals engaging the longitudinal recesses, with the journals being provided with roller members which are held substantially isogonally in the longitudinal recesses and which are held relative to the journals so as to be radially displaceable and angularly movable, with each roller member being rotatably supported on a roller carrier and with the journals, at their ends, each having pivot heads which are firmly connected thereto and which engage a radial cylindrical inner recess of a roller carrier so as to be radially movable and angularly movable at right angles thereto around two axes.

18 Claims, 3 Drawing Sheets

CONSTANT VELOCITY UNIVERSAL JOINT HAVING AN INNER JOINT PART WITH SPHERICAL TRUNNIONS PROVIDED WITH ROLLER MEMBERS GUIDED IN AN OUTER PART

This is a continuation of U.S. patent application Ser. No. 07/940,234, filed Sep. 3, 1992, now abandoned, which is a contination of Ser. No. 07/607,232, filed Oct. 31, 1990, now U.S. Pat. No. 5,167,583.

BACKGROUND OF THE INVENTION

The invention relates to a constant velocity universal joint of the tripod type having an outer joint part provided with three circumferentially distributed, axially extending longitudinal recesses with circumferentially distributed opposed running faces, an inner joint part provided with three circumferentially distributed radial journals engaging the longitudinal recesses, with each of the journals being provided with roller members which are held substantially isogonally in the longitudinal recesses and which are held relative to the journals so as to be radially displaceable and angularly movable, with each roller member being rotatably supported on a roller carrier.

Simple tripod joints in the case of which the roller members are supported coaxially relative to the respective journal are disadvantageous in that, with an articulated joint, the oscillating axial movements of the rollers in the tracks do not take place in the form of clean rolling movements, but because of the angular position of the rollers relative to the direction of movement, they include a friction component as a result of which there occur considerable friction forces leading to axial vibration excitations out of the joint. It is therefore an improvement if, with an articulated joint, the roller members oscillate isogonally in a clean rolling movement in the longitudinal recesses, whereas the sliding movements of the radial displacement of the roller members on the journals and the angular movement of the roller members relative to the journals take place on pairs of faces which are independent of the longitudinal recesses.

From DE 31 03 172 C 2 and DE 38 03 340 A 1 there is known a joint in which an intermediate ring with a spherical segment face is radially movable on the cylindrical journal which engages a calotte face of a roller carrier. On the roller carrier, the roller member is supported in needles. With this design, production is very expensive because it is necessary to machine two pairs of faces sliding on each other, with one of them being designed as a ball/calotte combination.

From DE 28 31 044 A 1, in addition to the joint of the said type, there are known designs in the case of which the journals are provided with spherical heads which, on the one hand, are directly radially movable and engage bearing needles of the roller member and which, on the other hand, cooperate with a calotte-shaped inner face of an intermediate ring radially movable in the roller member. In the former case, the point contact between the ball head and bearing needles leads to an uncontrollable surface pressure, and in the latter case, the rotational support means for the rollers are designed as friction bearings only, with the production and assembly of the inner ring being complicated and expensive.

From DE 36 19 728 A 1 there is known a tripod joint in which the direct contact with the tracks of the outer joint part is established by linearly arranged rolling members which are held by a pivot head of rectangular shape if viewed radially. An essentially similar tripod joint is known from JP-A-59-40016, in which the tripod journals comprise spherical heads radially movably engaging internally cylindrical recesses in the pivot heads. In the former case there are provided purely axial roller assemblies as rolling members. In the latter case, balls especially held in continuous guiding means form the rolling members. Producing the pivot heads is expensive, and there is a need for expensive and sensitive connecting means between the pivot head and the spherical member. Below the spherical head, the journal cross-section is reduced which is-disadvantageous from the point of view of strength.

From DE 37 16 962 A 1 there is known a joint in which an intermediate ring rotatably supported on the cylindrical journal by means of rolling members comprises a spherical outer face which is guided angularly movably and radially displaceably in an internally cylindrical face of the roller member. Essentially there are no rotary movements between the intermediate ring and the roller member. Producing this design is also expensive because the intermediate ring has to be provided with an accurate spherical sliding face, with the roller member having to comprise an accurately machined outer running face.

SUMMARY OF THE INVENTION

Accordingly, it is an object of the present invention to provide a joint of the above-mentioned type which, while retaining the essential functional advantages and effects is considerably simplified in respect of design and production technology.

Pursuant to this object, and others which will become apparent hereafter, one aspect of the present invention resides in the journals, at their ends, comprising spherical heads which are firmly connected thereto and which engage a radial cylindrical inner recess of a roller carrier so as to be radially movable and angularly movable at right angles thereto around two axes. The most suitable bearing means in this case are needle bearings in accordance with the state of the art. While the roller member is essentially designed in the same way as the state of the art roller member, the roller carrier in accordance with the invention is simplified relative to the roller member or intermediate ring according to the state of the art as it does not have to comprise any spherical faces, whereas the additional formations at the journals may largely be preformed by forming techniques when producing the tripod star so that the necessary machining methods are very slight.

The essential advantage of the joint in accordance with the invention is that even with an articulated joint the needle bearing used intersects the central axis of the longitudinal recess at right angles. As a consequence, the rolling movement of the roller members on the roller carrier remains free from any interference while bearing load conditions are ideal.

In an embodiment which is particularly advantageous from the point of view of strength, the journal neck, below the spherical head, at the weakest point, comprises a non-circular cross-section in which the diameter in the circumferential direction is greater than the diameter in the axial direction. In this way, the supporting cross-sectional face of the journal is advantageously increased, and in particular, the diameter in the direction of the highest bending load is increased.

In a further advantageous embodiment, the cross-section of the journal is oval, i.e., especially elliptical so that upon tilting of the roller assembly held on the journal head, there occurs an essentially uniform free space along the lower inner edge of the roller assembly relative to the journal surface. The lateral necking of the journal neck—as viewed axially—i.e., the cross-sectional reduction relative to the spherical head should only be slight because pivoting of the roller members under torque load relative to the journal axis is relatively slight, although in this case, too, a degree of freedom has to be provided. The reinforced journal feet permit an increase in the plug-in aperture for the driveshaft in the inner joint part so that the torque capacity of the joint is increased.

In a preferred embodiment, the roller member is axially secured on the roller carrier because radial displacement of the rollers relative to the joint axis takes place between the roller carrier and the spherical head of the journal.

As far as the outer shape of the roller members is concerned, there are a number of suitable shapes known in themselves, in which the shape of the running faces of the longitudinal recesses has to be adapted in a suitable way.

In particular, care should be taken to ensure that with an extended joint under torque load, the line of contact between the journal and roller carrier, on the one hand, and the line of contact at the roller relative to the running faces, on the other hand, are positioned in a plane positioned at right angles relative to the journal or, if the roller has two lines of contact relative to the running faces, that these should be symmetrical relative to the first.

According to a first possibility, the running faces of the longitudinal recesses are designed to be planar and the roller members, in the region of contact with the running faces, are designed to be cylindrical. In an alternative embodiment, the running faces of the longitudinal recesses may be cylindrical in the longitudinal direction, i.e., their cross-section may have a Gothic shape, with the roller members, in the region of contact with the running faces, being designed to be spherical.

However, it is not essential for the cross-sectional shapes of the running faces and roller members to correspond to each other. For instance, it is possible to combine spherical rollers with Gothic running faces of the longitudinal recesses as a result of which—in contrast to previously mentioned designs—slewing of the rollers in the tracks is prevented. However, this may also be ensured by corresponding roof-shaped cross-sectional shapes of the running faces and roller members.

In any case, in order to ensure clearly defined movements, it is advisable to prevent radial movements and angular movements of the rollers relative to the central axis of the outer joint part by providing axially extending contact shoulders along the running faces in the longitudinal recesses, at least at the aperture end. Such axially extending shoulders may cooperate directly with the roller members, while holding them isogonally in the outer joint part or they may cooperate with corresponding counter faces at the roller carriers in order to hold these isogonally in the outer joint part of they may cooperate with corresponding counter faces at the roller carriers in order to hold these isogonally in the outer joint part and because of the axial security of the roller members relative thereto, they may have the same effect thereon. Friction may be reduced by designing the cross-sections of the shoulders and/or the roller carriers and roller members in the region of contact with a convex shape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
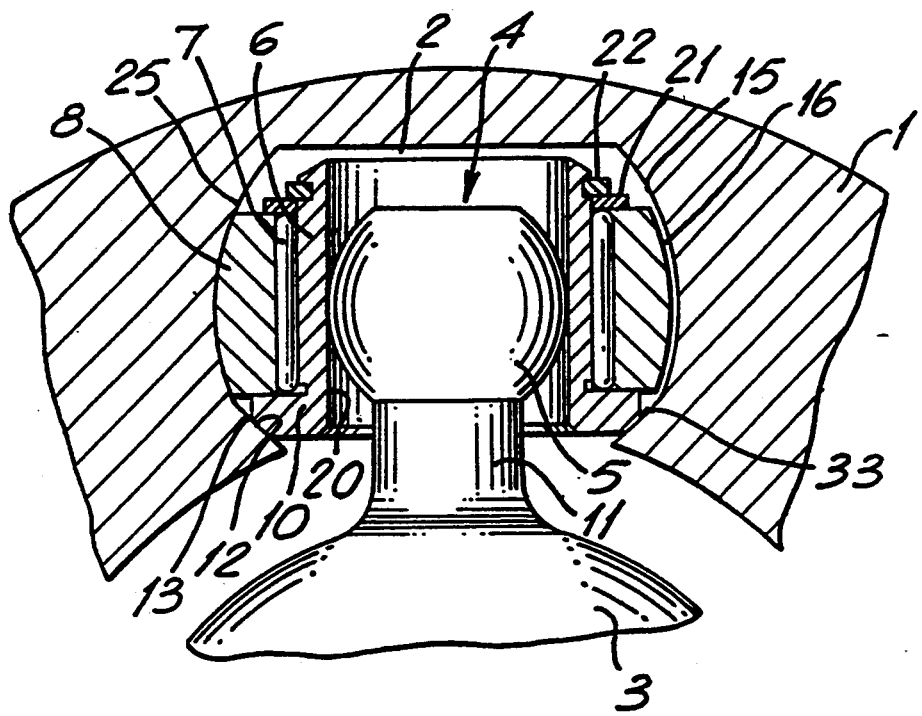
FIG. 1 is part of a section through a joint showing a longitudinal recess and a journal in a first embodiment.
Figure 2:
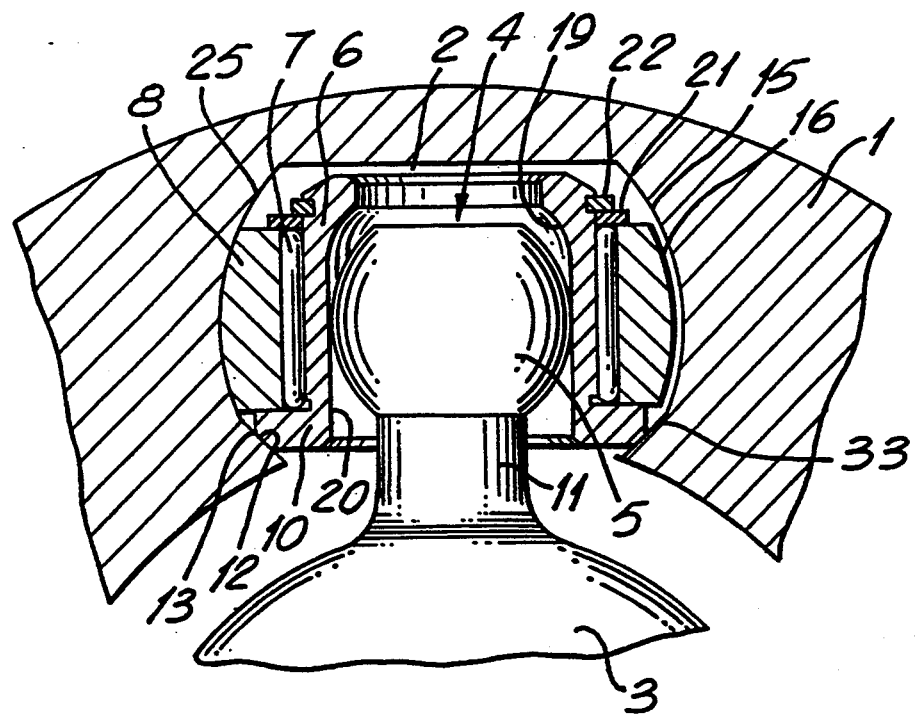
FIG. 2 is part of a section through a joint according to FIG. 1, showing a longitudinal recess and a journal in a second embodiment with a modified roller carrier.
Figure 3:
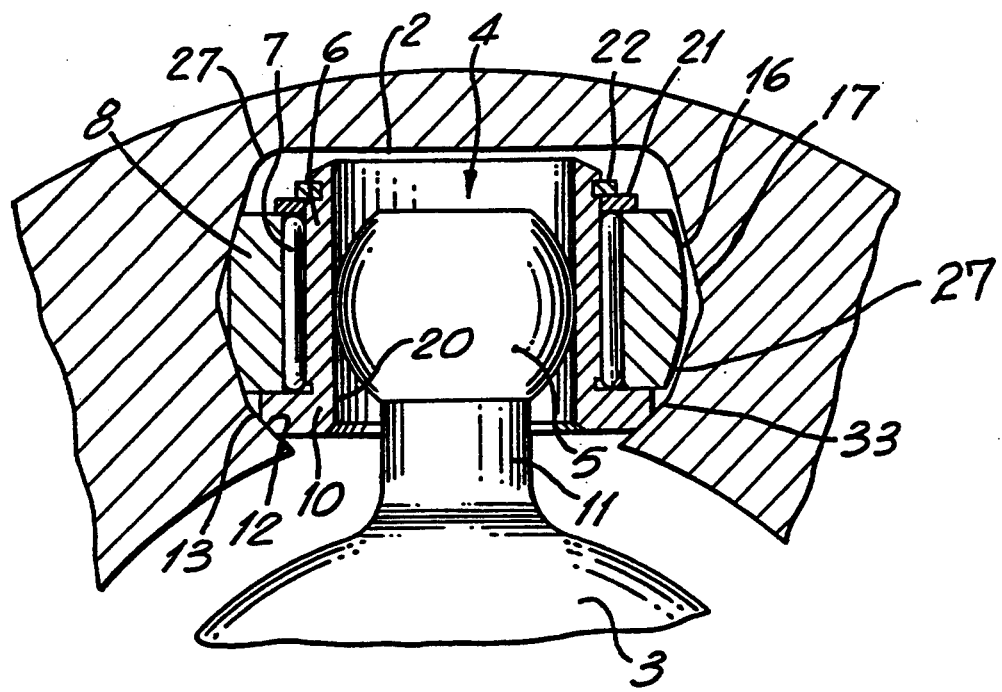
FIG. 3 is part of a section through a joint according to FIG. 1, showing a longitudinal recess and a journal in an embodiment with a modified track cross-section.

FIGS. 1 to 4 show an outer joint part 1 having a longitudinal recess 2, as well as an inner joint part 3 having a journal 4 which is attached thereto, which comprises a spherical pivot head 5 and which indirectly, via a roller carrier 6 and a needle bearing 7, carries a roller member 8, 9. The needle bearing 7 and the roller member 8, 9 are held relative to the roller carrier 6 by an integral projection 10, on the one hand, and by a disc 21 and a securing ring 22, on the other hand. The projection 10 is provided with a stop face 12 which rests on drawn-in shoulder regions 13, 14 of the longitudinal recess 2 for the purpose of providing axial security. In FIGS. 1 to 3, the shoulders 13 are provided in the form of planar faces whereas in FIG. 4 the shoulders 14 have a spherical cross-section.

Figure 4:
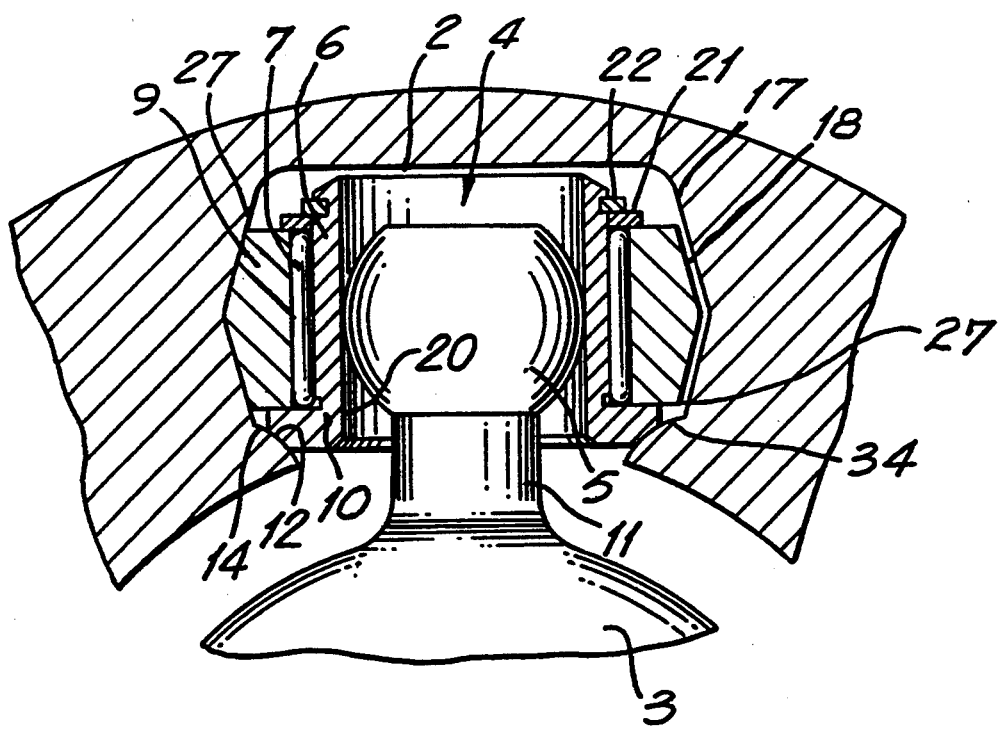
FIG. 4 is part of a section through a joint according to FIG. 3 showing a longitudinal recess and a journal in an embodiment with a modified roller shape.

In FIGS. 1 to 4, the roller carrier 6 has a cylindrical inner face 20 holding the spherical pivot head 5 so as to be articulatable and radially displaceable. In FIGS. 1 and 2, opposed cylindrical running faces 15, 25 of the longitudinal recess 2 cooperate with a spherical outer face 16 of the roller member 8 and during the transmission of torque they are in contact with one of the running faces. FIGS. 3 and 4 show roof-shaped running faces 17, 27, with a roller member 8 with a spherical outer face 16 rolling therein, whereas FIG. 4 shows a roller member 9 having an adapted doubly conical outer face 18. The figures indicate the clockwise transmission of torque from the outer joint part to the inner joint part. Whereas in FIGS. 1, 3 and 4 the inner face 14 of the roller member 8 is continuously cylindrical, an internally spherical stop face 19 has been added in the radially outer region in FIG. 2.

Figure 5:
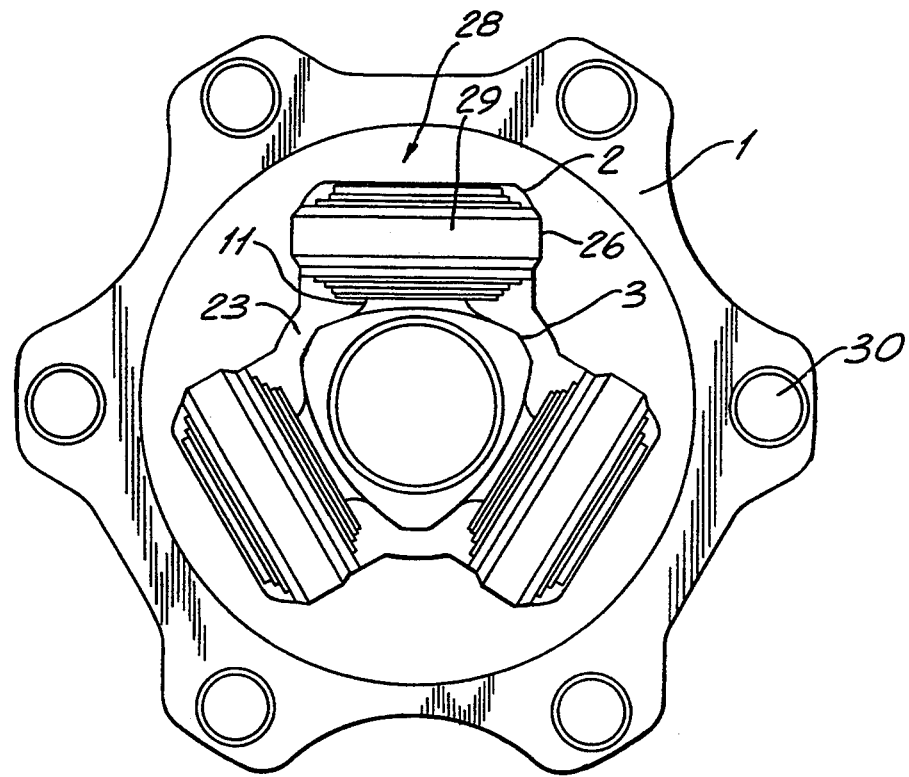
FIG. 5 shows an axial view of a joint in accordance with the invention.

FIG. 5 shows an outer joint member 1 in accordance with the invention having three longitudinal recesses 2 which are circumferentially offset by 120° and which are connected to each other via a central joint interior 23. The outer joint part comprises threaded connecting holes 30 to permit connection to a shaft flange. Each longitudinal recess is provided with circumferentially opposed tracks 24, 26 which, in the embodiment as illustrated, are provided with a slightly convex surface without this being of any significance for the subject of the invention. An inner joint part 3 in the form of a tripod star is introduced into the outer joint part 1 and comprises circumferential distributed journals 4 which engage the longitudinal recesses 2 of the outer joint part 1 and which each comprise roller assemblies 28 which are pivotable and radially displaceable relative to the journals. Apart from further details, the roller assemblies comprise outer rollers 29 which are in direct contact with the track 24, 26 and whose cross-section has a slightly concave shape without this being of any significance for the subject of the invention.

Figure 6A:
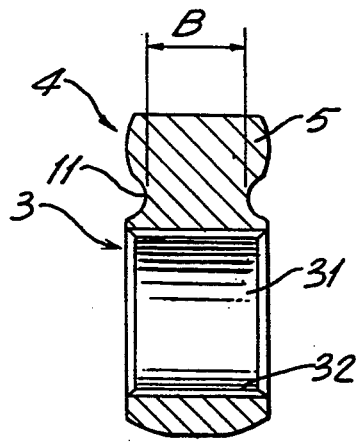
FIGS. 6a–6c show a tripod star in accordance with the invention (a) in a longitudinal section; (b) in an axial view; and (c) in a tangential section through the journal neck.
Figure 6B:
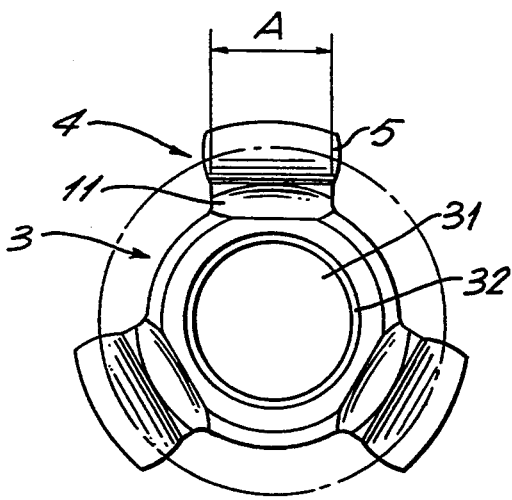
Figure 6C:
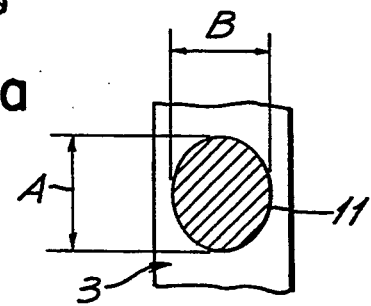
Figure 3:
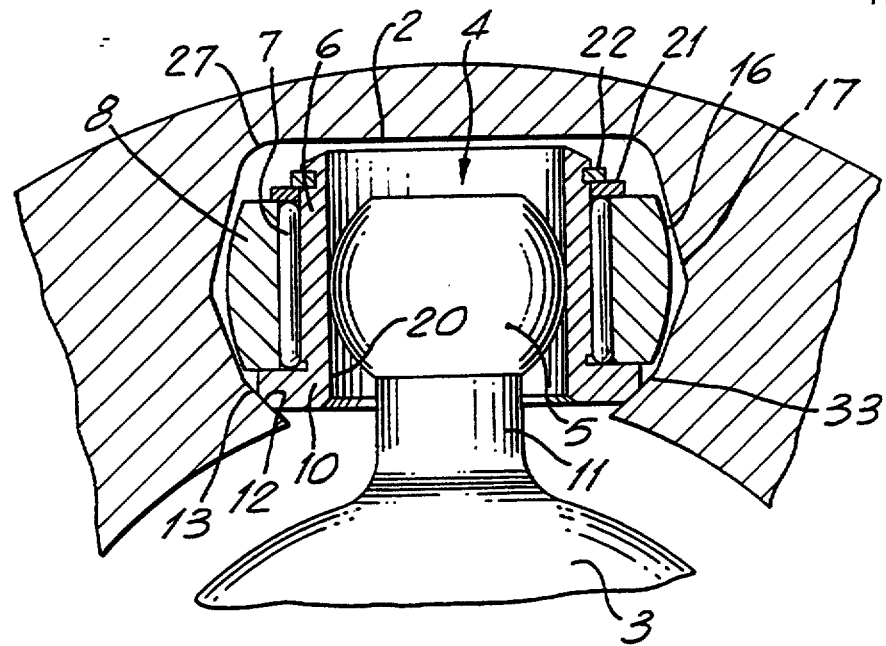
Figure 4:
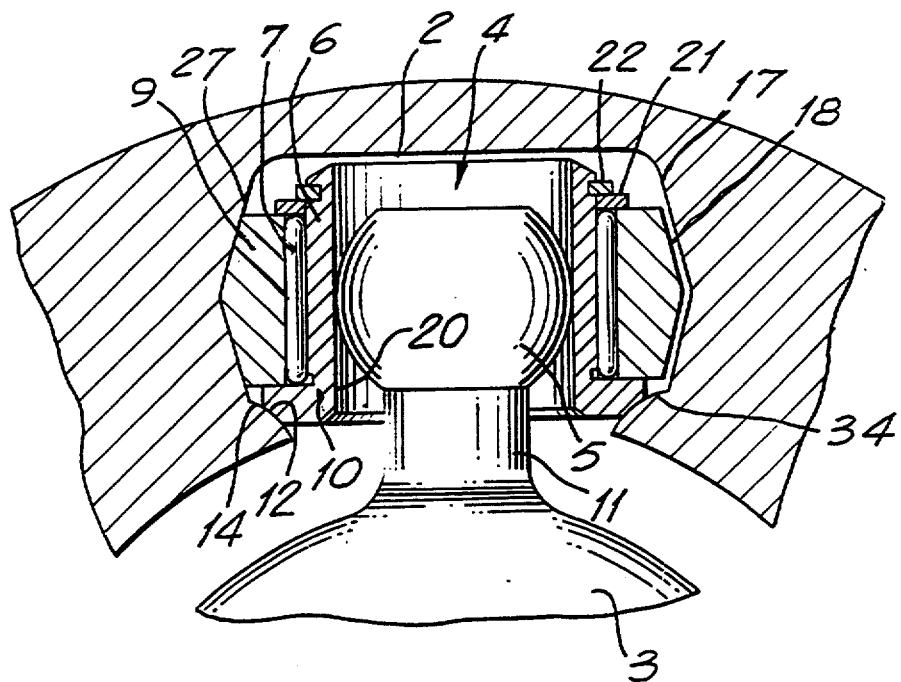

FIGS. 6a–6c show an inner joint part in accordance with the invention in the form of a tripod star which, in an axial section and in an axial view, reveals the inner bore 31 with splines 32, with the journals 4 having a spherical head 5 whose diameter is increased relative to that of the journal neck 11. As is particularly obvious from the detail illustrating the cross-section of a journal, the diameter A of the journal neck 11 in the circumferential direction is clearly increased relative to the diameter B in the axial direction, thereby giving the cross-section of the journal neck 11 the shape of an ellipse.

While the invention has been illustrated and described as embodied in a constant velocity universal joint, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A constant velocity universal joint of a tripod type, comprising: an outer joint part provided with three circumferentially distributed, axially extending longitudinal recesses with circumferentially opposed running faces; and an inner joint part provided with three circumferentially distributed radial journals engaging the longitudinal recesses, each of the journals being provided with roller members which are held substantially isogonally in the longitudinal recesses and which are held relative to the journals so as to be radially displaceable and angularly movable, each of the roller members being rotatably supported on a roller carrier, the journals, at their ends, each having spherical heads fixed thereto so as to engage a radial cylindrical inner recess of the roller carrier so as to be radially movable and angularly movable into any position as a result of being movable around two axes perpendicular to one another.

2. A joint according to claim 1, wherein the journals have a journal neck with an oval cross-section.

3. A joint according to claim 1, and further comprising needle bearings provided between each roller carrier and the roller member supported thereon.

4. A joint according to claim 1, wherein the roller members are axially secured on the axis of roller carriers.

5. A joint according to claim 1, wherein the running faces of the longitudinal recesses are planar, and the roller members, in a region of contact with the running faces, are cylindrical.

6. A joint according to claim 1, wherein the running faces of the longitudinal recesses are cylindrical in the longitudinal direction, circular-arch-shaped in cross-section, and the roller members are spherical in a region of contact with the running faces.

7. A joint according to claim 1, wherein the running faces of the longitudinal recesses have a Gothic cross-section, and the roller members in a region of contact with the running faces are one of spherical and drum-shaped.

8. A joint according to claim 1, wherein the running faces of the longitudinal recesses have a roof-shaped cross-section, and the roller members in a region of contact with the running faces are one of spherical, drum-shaped or roof-shaped.

9. A joint according to claim 1, wherein the journals have a journal neck below the spherical head (5), with journal neck having a weakest point of minimal cross section area with a non-circular cross-section with a diameter in the circumferential direction greater than a diameter in the axial direction.

10. A joint according to claim 9, wherein the journal neck has the diameter which is reduced in the axial direction to an extent so that only at maximum planned joint articulation there remains only a small amount of play between the surface of the journal neck and an inner lower edge of the roller carrier.

11. A joint according to claim 9, wherein the journal neck has the diameter which is reduced in the circumferential direction relative to the coupling axis to an extent so that, if a tripod cross is positioned at an angle relative to planes of symmetry between roller track pairs, there remains only a small amount of free space between the surface of the journal neck and an inner lower edge of the roller carrier.

12. A joint according to claim 11, wherein with an extended joint, contact lines between the spherical head and the roller carrier and between the roller member and the track are positioned symmetrically relative to one plane.

13. A joint according to claim 1, wherein the longitudinal recesses have axial extending shoulders provided along the running faces which cooperate with the roller carriers and the roller members, while holding same isogonally in the outer joint part.

14. A joint according to claim 13, wherein the shoulders have a convex cross-section and the roller carriers and the roller members are spherical in a region of contact with the shoulders so as to reduce friction.

15. A joint according to claim 13, wherein the shoulders have a convex cross-section.

16. A joint according to claim 13, wherein the roller carriers and the roller members are spherical in the region of contact with the shoulders so as to reduce friction.

17. A constant velocity universal joint comprising:
an outer joint part provided with three circumferentially distributed, axially extending longitudinal recesses with circumferentially opposed running faces;

an inner joint part provided with three circumferentially distributed radial journals engaging the longitudinal recesses, each of the journals being provided with roller members which are held in the longitudinal recesses and which are held relative to the journals so as to be radially displaceable and angularly movable, each of the roller members being rotatably supported on a roller carrier, the journals, at their ends, each having unitary spherical heads to engage a radial cylindrical inner recess of the roller carrier so as to be radially movable and angularly movable at right angles thereto around two axes.

18. A joint according to claim 17, wherein the journals have a journal neck below the spherical head, with the journal neck at its weakest point, having a non-circular cross section.

* * * * *

UNITED STATES PATENT AND TRADEMARK OFFICE
CERTIFICATE OF CORRECTION

PATENT NO. : 5,411,440      Page 1 of 2
DATED : May 2, 1995
INVENTOR(S) : Jörg Bensinger, Werner Krude, Dieter Jost It is certified that error appears in the above-indentified patent and that said Letters Patent is hereby corrected as shown below:

ON THE TITLE PAGE:

Item [75], INVENTORS;
The second inventor "Krude Werner"
should be --Werner Krude-- ;

Item [30], Foreign Application Priority Data;
"Nov. 30, 1990" should be --Nov. 3, 1989--.

Drawing sheet consisting of Figs. 3 and 4, should be deleted to be replaced with the Drawing sheet, consisting of Figs. 3 and 4, as shown on the attached page.

Signed and Sealed this

Nineteenth Day of March, 1996

Attest:

BRUCE LEHMAN

*Attesting Officer*      *Commissioner of Patents and Trademarks*